US006157436A

United States Patent [19]

Cok

[11] Patent Number: 6,157,436

[45] Date of Patent: Dec. 5, 2000

[54] IMAGE PRINTING

[75] Inventor: Ronald S. Cok, Rochester, N.Y.

[73] Assignee: Eastman Kodak Company, Rochester, N.Y.

[21] Appl. No.: 09/143,842

[22] Filed: Aug. 31, 1998

[51] Int. Cl.[7] .................................................... G03B 27/52

[52] U.S. Cl. ................................ 355/40; 355/77; 399/83; 399/84

[58] Field of Search .................................... 396/564, 612; 355/40, 41, 54, 77; 399/83, 84; 345/435

[56] References Cited

U.S. PATENT DOCUMENTS

| | | | |
|---|---|---|---|
| 4,791,456 | 12/1988 | Hope et al. | 355/28 |
| 4,970,554 | 11/1990 | Rourke | 399/84 |
| 5,459,819 | 10/1995 | Watkins et al. | 345/435 |
| 5,559,933 | 9/1996 | Boswell | 358/1.15 |
| 5,761,558 | 6/1998 | Patton et al. | 355/77 |
| 5,859,711 | 1/1999 | Barry et al. | 399/83 |

FOREIGN PATENT DOCUMENTS

| | | |
|---|---|---|
| 0 628 874 | 12/1994 | European Pat. Off. . |
| 0 793 142 | 9/1997 | European Pat. Off. . |
| 0 933 679 | 8/1999 | European Pat. Off. . |
| 4-289840 | 10/1992 | Japan . |
| 4-314047 | 11/1992 | Japan . |

*Primary Examiner*—D. Ruthledge
*Attorney, Agent, or Firm*—Gordon M. Stewart; David A. Novais

[57] ABSTRACT

An image printing system for generating multiple printed image copies in response to an order. A processor can divide the order into multiple sub-orders for respective image printers, each sub-order having a sub-order header which includes a unique order identification and an indication of the number of copies of the image to be printed by the corresponding printer. A plurality of image printers are connected to the processor, to each receive a corresponding sub-order and print the corresponding sub-order header, and the numbers of image copies indicated in that header. A method which can be executed by such a system and a computer program product which can execute the method on a programmable computer, are also provided.

31 Claims, 3 Drawing Sheets

IMAGE PRINTING

FIELD OF THE INVENTION

This invention relates to images, and in particular to the printing of images in a photographic laboratory.

BACKGROUND OF THE INVENTION

In typical photofinishing operations a user (sometimes referenced as a customer), delivers one or more film rolls carrying corresponding exposed films, to a processing laboratory to have them chemically developed and hardcopies of the images (such as paper prints or slides) prepared. The user can include an individual or a retail store. Individual films are often spliced together end to end to form a larger roll which is easily handled by automated equipment. Following chemical processing of the roll to yield permanent images from the latent images on the films, each image is scanned at high speed to obtain image characteristics, such as color and density. These characteristics are passed to an optical printer which uses the characteristic data to adjust exposure conditions (such as exposure time, color balance, and the like) of an image frame on the developed film which is optically projected onto a photosensitive paper. The exposed photosensitive paper is then chemically developed to yield the final hardcopy prints. In modern photofinishing operations, images may optionally also be scanned to provide an image signal corresponding to each image on the film. These image signals are usually stored on a medium such as a magnetic or optical disk and provided to the customer, or made available to the customer over the Internet, and may be used then or at a later time to provide a hardcopy output. Recently it has been described that the optical printer can be replaced with a digital printer which will print the images directly from the scanned data, following enhancements or other manipulations to the scanned images. When the customer order is completed, each film is cut into strips (for 35 mm film) or reattached to a film cassette (for Advanced Photo System films), the exposed paper (when prints are made) is cut into individual prints, and the film, completed prints and any other media (such as a disk bearing scanned images, or mounted slides) are packaged at a finishing station and the order is then complete.

It is known to provide a service whereby a photographer can provide a particular image to a service operator, who will scan the image and print it on T-shirts, cups, calendars, or similar items. Such products can also be ordered remotely from a personal computer using digitized images and a service such as Eastman Kodak's KODAK IMAGE MAGIC PRINT SERVICE. It has been known that when a single product is ordered from a printer of a photofinishing system, a separate sheet can be printed at the printer which sheet has a thumbnail of a print to follow, an indication of the number of copies of the print, and a customer address. However, there is a high degree of interest among photographers, in obtaining multiple image products from a photofinisher, which incorporate their images. Various customer image products are, for example, described in U.S. Pat. No. 5,459,819. Digital photofinishing operations in particular, lend themselves to readily providing a multitude of image incorporating products in accordance with customer instructions. However, different image products desired by customers may require different image printers. For example, a customer request for a poster or a T-shirt incorporating an image may require the use of different special large format printers, in addition to the use of a printer to provide the typical smaller sized prints desired by customers. This means that to complete such a customer's order will require assembly of prints from a number of different physically separated printers. Furthermore, each printer will not likely print every image, and different printers may operate at different speeds, and the product composition of each order will likely be different (some requiring the use of only one printer, while others require the use of one or more other printers). Thus, it is very likely that a customer's image products will be printed on different printers at different times, and will be intermingled with products intended for other consumers. This requires a photofinishing operator to visually monitor the status of printers to determine when a printer has finished producing image prints which may belong to a given order.

The foregoing situation leads to the problem of assembling all image prints requested in a given customer order at a single location so that the completed customer order can be packaged, ready for delivery to the customer. One existing approach is the use of a single printing device for serial outputs of general content, where each page in a print request is different, is demonstrated by the common office laser printer. Such printers are under computer control and can be configured to print a "banner" page between each print request. The print "files" may have any number of pages. The banner print serves to identify the printout. A very similar approach is taken in the use of a conventional facsimile machine. The user typically fills out a form identifying the recipient and number of pages in the fax and places the form at the beginning of the pages to be transmitted. At the receiving end, the fax machine may print several transmissions in a row before the output is picked up by the recipient. Each form at the beginning of each transmission serves to identify the pages of that transmission. In neither case, however, is it necessary to collate multiple different outputs from multiple devices.

In conventional photofinishing operations, an identification of an image order may be placed on each output of a given order. For example, the different prints, computer or computer disks may carry a common identifier for each order. Those products may then be collated for delivery to the customer by combining all of the products with a common identifier. However, such a method requires marking the image products themselves with the identification, which some customers find undesirable. In addition, typical commercial photofinishing operations may process images at the rate of 200 per minute or much higher. Matching prints from multiple printers using such a technique can be demanding, since each product must be identified.

It would be desirable then, to have some method to facilitate collating image prints from different printers, which prints are of images from the same customer order, and which method does not require matching printed identifications on all image prints from all sub-orders. It would also be desirable if a photofinishing operator knew when to look at a given printer to locate an image print of a given customer order, so that maintaining a visual watch on multiple printers would be unnecessary.

SUMMARY OF THE INVENTION

The present invention provides in one aspect, an image reproduction system for generating one or more image copies in response to an order. The apparatus includes a processor which can divide the order into multiple sub-orders for respective image output systems, each sub-order having a sub-order header which includes a unique order identification and an indication of the number of copies of the image to be provided by the corresponding output device. The apparatus optionally includes a plurality of output systems connected to the processor, each of which receives a corresponding sub-order, generates one or more image copies in response to that sub-order, and generates a corresponding sub-order header in association with the generated image copy. In this aspect, each output system may, for example, generate image copies such as image copies on a magnetic or optical disk, or on other media. In cases where the generated image copies are prints, the same printer can be used for printing both the image copies and for creating a printed sub-order header. Even in cases where the generated image copies are not image prints (for example, magnetic disks), the same image writing device (for example, a magnetic disk drive) can still be used to provide the sub-order header on the same type of media (for example, a magnetic disk) provided the sub-order headers are only to be used in a suitable machine reading system. When the sub-order headers will be used in a manual collating system, they should be printed by a printer so as to be human readable. Thus, each output system can include both an image writer and a separate printer to print the sub-order header, each printer being associated with its corresponding image writer although when the image writer is a printer an output system can, if desired, just be that one printer which prints both the image prints and sub-order header.

In a further aspect, the present invention provides an image printing system for generating multiple printed image copies in response to an order. The system includes an processor which can divide the order into multiple sub-orders for respective image printers. Each sub-order has a sub-order header which includes a unique order identification and an indication of the number of copies of the image to be printed by the corresponding printer. The system also includes a plurality of image printers connected to the processor, each of which receives a corresponding sub-order and prints the corresponding sub-order header, and the numbers of image copies indicated in that header.

The processor may provide at least one sub-order header with an identification of another printer at which another sub-order is to be printed, or may provide a sub-order header for each corresponding image printer which additionally includes an identification of each other image printer to which sub-orders of the order are to be printed. The processor may further provide at least one sub-order header (or each of plural sub-order headers) which includes an identification of at least one characteristic of image prints which will be generated by the printer to which that sub-order will be sent for printing. Furthermore, the processor may alternatively or additionally provide at least one sub-order header with an identification of at least one characteristic of image prints which will be generated by another printer at which the another sub-order of the order is printed. Any of the foregoing identifications in a sub-order header may take on different forms, for example, a description of the sizes of prints of that sub-order. Another particular form of an identification is a reduced resolution version of an image of the corresponding sub-order (for example, a "thumbnail" size copy of the actual image or images to be printed in that sub-order).

A sub-order itself may typically, but not necessarily, include the actual image signal from which images are to be printed. In one aspect of the invention, the processor also forwards an index of sub-orders to a printer, which index includes an identification of all printers to which sub-orders of the order are forwarded.

In another aspect, an image printing system of the present invention may also include a print status monitor. The print status monitor determines, for an image printer, a print status of the corresponding sub-order and forwards print status information to another image printer. The other image printer prints the received sub-order status information. The print status information may, for example, include estimated time for printing the sub-order at the corresponding printer (including, for example, time required to print the complete sub-order or time to complete printing of a partially printed sub-order. In a particular aspect, the print status monitor determines for one or more image printers, a print status of the corresponding sub-order, and forwards print status information to image printers which have not printed their corresponding sub-order header. In this particular aspect, image printers which have not printed their corresponding sub-order header, print received sub-order status information for other image printers along with their sub-order header.

In a further aspect of the present invention, a print status monitor determines for image printers, a print status of the corresponding sub-order, and forwards print status information to image printers which have not printed their corresponding sub-order header. The determined print status information includes estimated time for printing the sub-order at each corresponding printer. Such estimated times for respective printers are printed along with the above described index. Image printers which have not printed their corresponding sub-order header, print received sub-order status information for other image printers along with their sub-order header.

The image printers may print images of a sub-order in a number of ways. For example, at least one of the image printers (and preferably all of them) may print the images of the sub-order allocated to that printer, sequentially as a series or with a common printed identification.

The present invention further provides a method which can be executed by an apparatus of any aspects of the invention.

Optionally, some additional association of the printed sub-order header with the printed images of that sub-order is provided. This association can be provided in a number of forms, for example at least one (or each) of the image printers may print the images of the sub-order allocated to that printer sequentially as a series, or with a common printed identification (such as a sub-order or order identification printed on a back side of each printed image, that is the side opposite the side on which the image is printed).

The invention further provides a computer program product for use with a programmable processor communicating with an image order input source and a plurality of image printers. The computer program product includes: a computer readable storage medium having a computer program stored thereon for which can perform the steps of any of the methods of the present invention.

The present invention is primarily related to the printing of images. However, the apparatus and method of the present invention can include any of those described in the present application, but in which any type of unique product customer orders are provided. Unique product customer orders are those which request multiple different items which may be unique in some way to each customer (including customer image copies), and which different items will be produced on multiple different output devices (including different format image printers). In such an aspect of the present invention, where the item output devices are not printers and a printed sub-order header is still required (such as for reading by an operator), each output device can be associated with a corresponding sub-order header printer.

A photofinishing laboratory is provided in a further aspect of the present invention. The photofinishing laboratory includes: (a) a chemical developer to develop latent images on a film; (b) a scanner to scan the developed images and generate corresponding image signals; (c) a memory to store the image signals; (d) an order receiver to receive an order for generating multiple prints of the images; and (c) an image printing system of the present invention.

The present invention can provide one or more of the following advantages, or alternatively or additionally one or more other advantages which can be discerned from the remainder of the application. Namely, the present invention can facilitate collation of prints from different printers, which prints are made from images of the same customer order. The method does not require printing an identification on each image print and matching all prints with the same code. The method can also provide a photofinishing operator with a convenient indication as to the status of image printing by printers which print image prints from the same customer order. Consequently, the need to maintain a visual watch on multiple printers can be reduced.

BRIEF DESCRIPTION OF THE DRAWINGS

Where practical, like reference numbers have been used to indicate like parts throughout the drawings.

DETAILED DESCRIPTION OF THE INVENTION

In the present application, it will be understood that a photographic laboratory includes a wholesale or retail photofinishing environment where many images from multiple customers are processed at a cost to the customers. While most photofinishing laboratories will include a chemical developer in which latent images on exposed photographic film or paper are developed, such is not essential in order to have a photographic laboratory. For example, it may be that the many images from the different customers are provided to the laboratory as digital images (for example, from digital cameras, on optical or magnetic disks, or from uploads from a remote terminal through a network such as the Internet), and that any image printing is done by non-photographic means (for example, with thermal or ink-jet printers).

Figure 1:
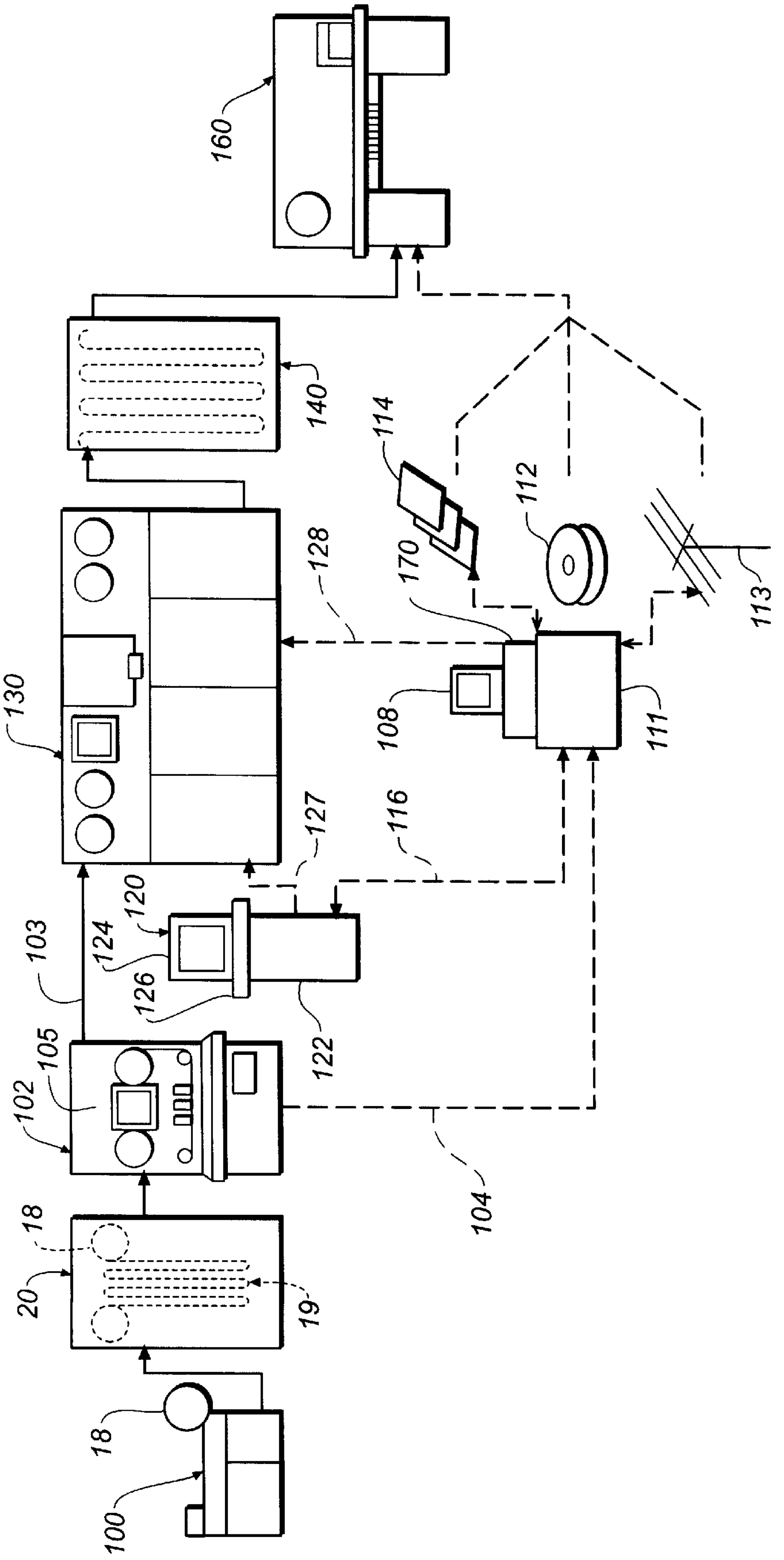
FIG. 1 is a diagram illustrating an image printing system of the present invention.

Turning to FIG. 1, a photographic laboratory incorporating an image printing apparatus of the present invention, will now be described. In FIG. 1, broken lines have been used to reference data communications (including image signals), while solid lines reference movement of physical items (for example, image prints, developed film, or magnetic or optical disks). In one embodiment, the apparatus of FIG. 1 includes a known type of splicer 100. Splicer 100 splices exposed light sensitive filmstrips which have been removed from their respective light tight cassettes, together in a series by attaching them end to end. Each filmstrip is normally regarded as a single customer order (although it is possible for a single customer order to include more than one filmstrip), and carries a plurality of exposed latent images (typically on light sensitive silver halide emulsion). The resulting attached series of filmstrips is referenced as a film which is placed on a reel 18. The film on reel 18 is then chemically developed through a series of steps in a chemical developer 20 to yield permanent visible physical images. Each filmstrip will typically be a negative type filmstrip yielding negative type images on a transparent base after developing by a multi-stage chemical developer 20 (indicated schematically in FIG. 1), although the filmstrips and developer 20 could be of a kind which produce positive transparencies (that is, slides) also in a known manner. In particular, chemical developer 20, in the case of a color film or color paper, will typically include a color developer, a bleach, and fixers, while in the case of a color reversal film will typically include a black and white developer, a fogging agent (chemical or illuminant), a color developer, bleach and fixer.

A developed film 19 exiting developer 20 is then passed to a high speed scanner 102 which operates at 200 images/minute or greater. Scanner 102 includes a film gate at which each image of the film can be successively positioned to receive light from a light source, which then passes through each image and a subsequent lens system to fall upon an image sensor. The image sensor can be a line sensor or area array sensor. Appropriate electronics (including an analog to digital converter) in the scanner 102 convert the sensor signals to digital signals. The output of scanner 102 then, is a series of digital image signals corresponding to each image on the film. Scanner 102 acts as a first capture device which provides the images in the form of digital image signals. Scanner 102 should be capable of scanning images with a reasonably high resolution, such as at least 400×200 pixels over the area of images (such as at least 600×400 pixels) and preferably at least 1000×1500 pixels (and most preferably at least 2000×3000 pixels). Scanners of the foregoing type are well known in the art and need not be described further. Scanner 102 includes intermediate storage 105 for the digital images, in the form of magnetic disk drives or any other suitable read/write storage device.

Scanner 102 is also fitted with a film code reader 103, which may either be an optical or a magnetic code reader, or both, capable of reading optical or magnetic codes on a filmstrip or a splice interconnecting filmstrips on film 19. Such codes may, for example, be provided by a customer on a filmstrip to indicate specific types of image processing he would like to have performed on all of the images or specific ones of the images (as indicated by the code) of his order. For example, such codes could indicate that the customer wants a panoramic print of a particular part of a specified image, or wants a particular image product incorporating the specified image (for example, or T-shirt or cup), or wants specified color modifications to a particular image (for example, indicating an order for a black and white print from a specified image), or could indicate that the customer wants a particular type of image output (for example, a portable optical or magnetic disk) with specified images at one or more indicated resolutions. The film codes may also indicate the number and type of prints (for example, poster or other size, or T-shirt or calendar type prints) of one or more (or all) of the images of the customer order, which the customer wishes to receive. The filmstrips or the splice can also carry a unique identification code, which is read by code reader 103, which uniquely identifies that filmstrip.

In an alternative embodiment, scanner 102 can receive developed filmstrips directly from a customer. Further, scanner 102 may alternatively or additionally, receive image prints on a reflective backing (usually paper) or image transparencies (such as slides) directly from the customer for scanning. In this case, scanner 102 will be suitably equipped to handle scanning of such formats and provide the corresponding digital image signals. Image signals and associated customer requests for products or services incorporating such images, can additionally or alternatively be received by a media station 111 from magnetic disks 114, optical disks 112, or over a communication channel 113 (see below). Media station 111 includes a monitor 108. When it is not contemplated that undeveloped filmstrips will be received from customers, developer 20 and optionally also splicer 100, could be dispensed with.

Image signals from scanned physical images on the film 19 or from magnetic disks 114, optical disks 112 or from remote terminals, as may be obtained through media station 111 (see below), and other information obtained by code reader 103 (including customer instructions and unique film identification) or received by media station 111, are passed over a two-way communication network 104 from scanner 102 to a processor in the form of an Image Data Manager ("IDM") 170. Network 104 may, for example, be optical or electrical, or have include two or more separate channels any or all of which may be optical or electrical. IDM 170 may include, for example, one or more general purpose digital microprocessors operating in parallel and suitably programmed to execute the functions required by each, or may be equivalent hard wired circuits in whole or in part. If parallel plural microprocessors are used, they may be programmed to execute the same or different image processing instructions, such as image enhancement or correction, and/or formatting for any particular one or more output devices. IDM 170 includes a read/write memory in the form of a magnetic disk drive. IDM 170 is also connected through network 116, 127, 128 with an operator or preview station 120 and a number of output devices in the form of printers 130, 132, 134. IDM 170 is further connected through network 104 to other output devices in the form of a media station 111, which provides image signal outputs on magnetic disks 114, optical disks 112, or over a communication channel 113 (which may be wire, fiber optic cable, or wireless) to the Internet.

IDM 170 may be programmed to execute the required steps of the present invention in any suitable manner, such as from a remote source over a communication channel, or from a computer program product carrying computer program code which will execute the steps of the methods of the present invention. The computer program product includes a computer readable storage medium which may, for example, include: magnetic storage media such as magnetic disc (such as a floppy disc) or magnetic tape; optical storage media such as optical disc, optical tape, or machine readable bar code; solid state electronic storage devices such as random access memory (RAM), or read only memory (ROM); or any other physical device or medium which might be employed to store a computer program.

It will be appreciated that in the present invention, image signals may be obtained from additional or other devices than scanner 102. For example, image signals might be provided to IDM 170 by being read from floppy magnetic disks 114, optical disks 112 or received from remote terminals over a over communication channel 113 connected to the Internet or some other network. Such image signals can be handled by IDM 170 and operator, or preview station 120 in the same manner as image signals received from scanned photographic media. It will be appreciated in this case that media station 111 is a media input and output station capable of both reading and writing to disks 112, 114 and transmitting or receiving over communication channel 113.

Operator station 120 includes a processor 122 and a connected monitor 124 (sometimes referenced as a screen) and operator input device 126 in the form of a keyboard and/or mouse or other suitable operator input device. Monitor 124 may, for example, be a CRT or LCD screen. Operator station 120 allows an operator to manually enter customer order information for any or all of the filmstrips, as might be read by the operator from a film bag carrying each filmstrip when it arrives at the photofinisher. This information is associated with a given filmstrip by being identified with the unique identification used to identify that filmstrip to the IDM 170. This association can be accomplished in a number of ways, such as by the operator manually entering the unique filmstrip identification into the input device 126 along with the instructions, or by IDM 170 displaying a unique filmstrip identification and the operator then entering the instructions corresponding to that unique filmstrip identification in response to such display. Operator station 120 exchanges information, as required, with IDM 170 through two-way network 104.

IDM 170 receives orders for generating prints from customer images on a given filmstrip, by receiving the actual image data from scanner 102 and receiving the customer instructions from code reader 103 or operator station 120. IDM 170 is capable of dividing the order into multiple sub-orders for respective image printers 130, 132, 134. For example, if printer 130 prints index prints, while printer 132 prints 7.5 by 12.5 cm paper prints ("service prints"), and printer 134 prints poster sized prints (for example, about 0.5 by 1 meter in size), IDM 170 will divide the customer order into customer sub-orders for index prints, service prints, and poster prints. Each of these sub-orders generated by IDM 170 includes a sub-order header which includes a unique order identification (which may be the same or a different identification as that described above), and an indication of the number of copies of an image of the order which will be printed by the corresponding printer (that is, the printer to which that sub-order is sent). IDM 170 is also capable of interrogating each printer 130, 132, 134 to obtain status information. Such information includes the print status of a particular sub-order which has been sent to that printer (for example, whether printing of that sub-order has started yet and/or estimated time to complete printing of a sub-order), as well as other information including the size of the print queue remaining for any printer. The results of such interrogation are sent back over network 104 to IDM 170.

Each of printers 130, 132, 134 may, for example, be a high speed color laser printer which prints digital image signals received from IDM 170 (or from preview station 120) on a light sensitive, silver halide emulsion, photographic paper web. Alternatively, any or all of the printers 130, 132, 134 could be inkjet, thermal, optical (optically printing enlargements from the developed film), Cathode Ray Tube ("CRT") or any other suitable image printer. Exposed photographic paper from printer 130 is then developed in color paper developer 140 to yield fixed images on the paper, in a known manner. The web, following developing in developer 140 is transported to a finishing station 160 to which the scanned film on reel 18 is also sent. Similarly a web or individual printed sheets from printers 132, 134 are also transported to finishing station 160. If either of printers 132, 134 print on light sensitive silver halide emulsion paper or film, there will be an intervening developing step, such as described above, between such printer and finishing station 160. At finishing station 160 any webs are cut into individual image prints, each scanned filmstrip is cut into strips (for 35 mm film) or reinserted into cassettes (for Advanced Photo System film), and any prints from printers 130, 132, 134 are mated with the corresponding customer film and any optical or magnetic disks 112, 114 to complete the customer's order.

Figure 2:
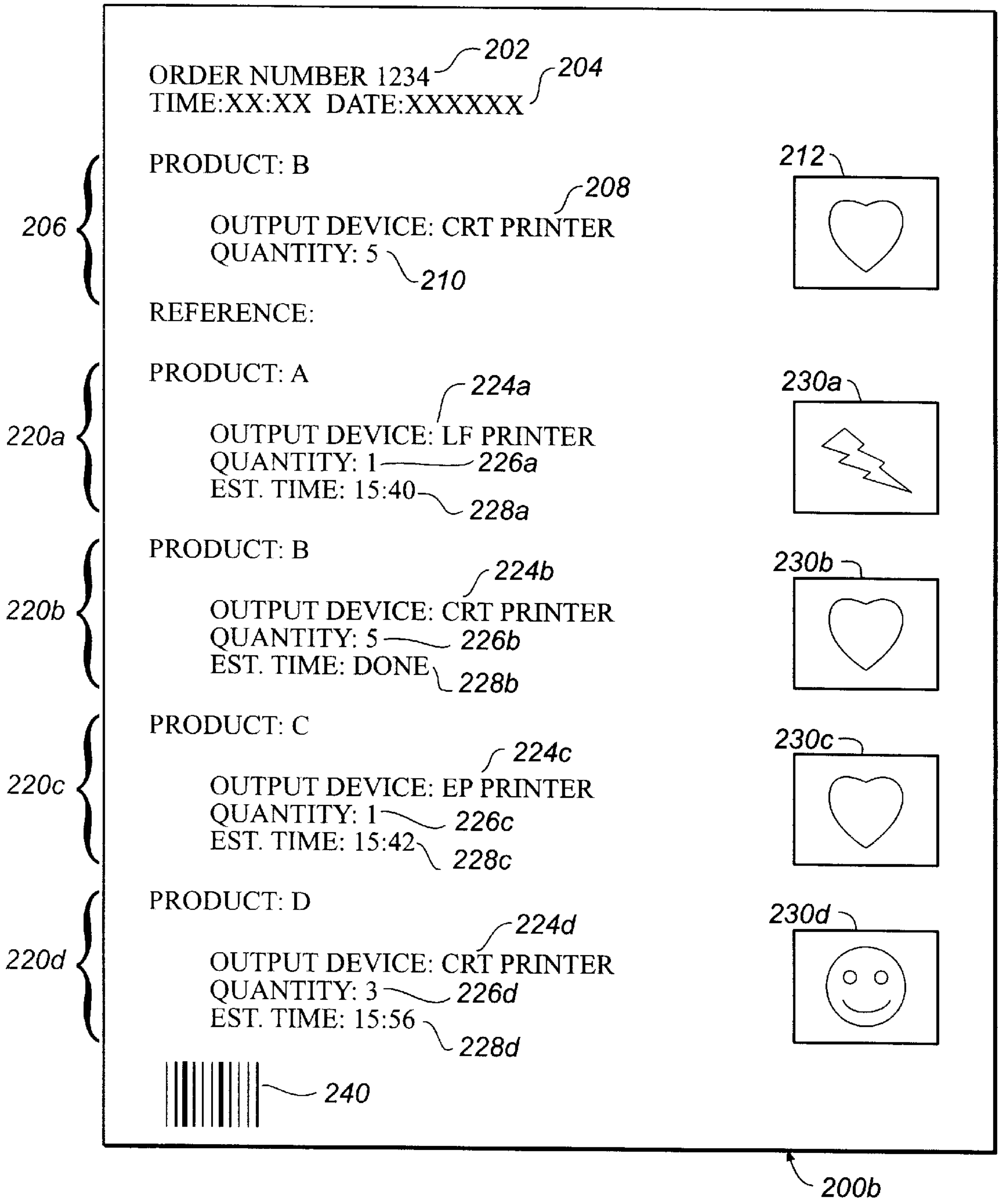
FIG. 2 is a sub-order header as produced by a method or apparatus of the present invention.
Figure 3:
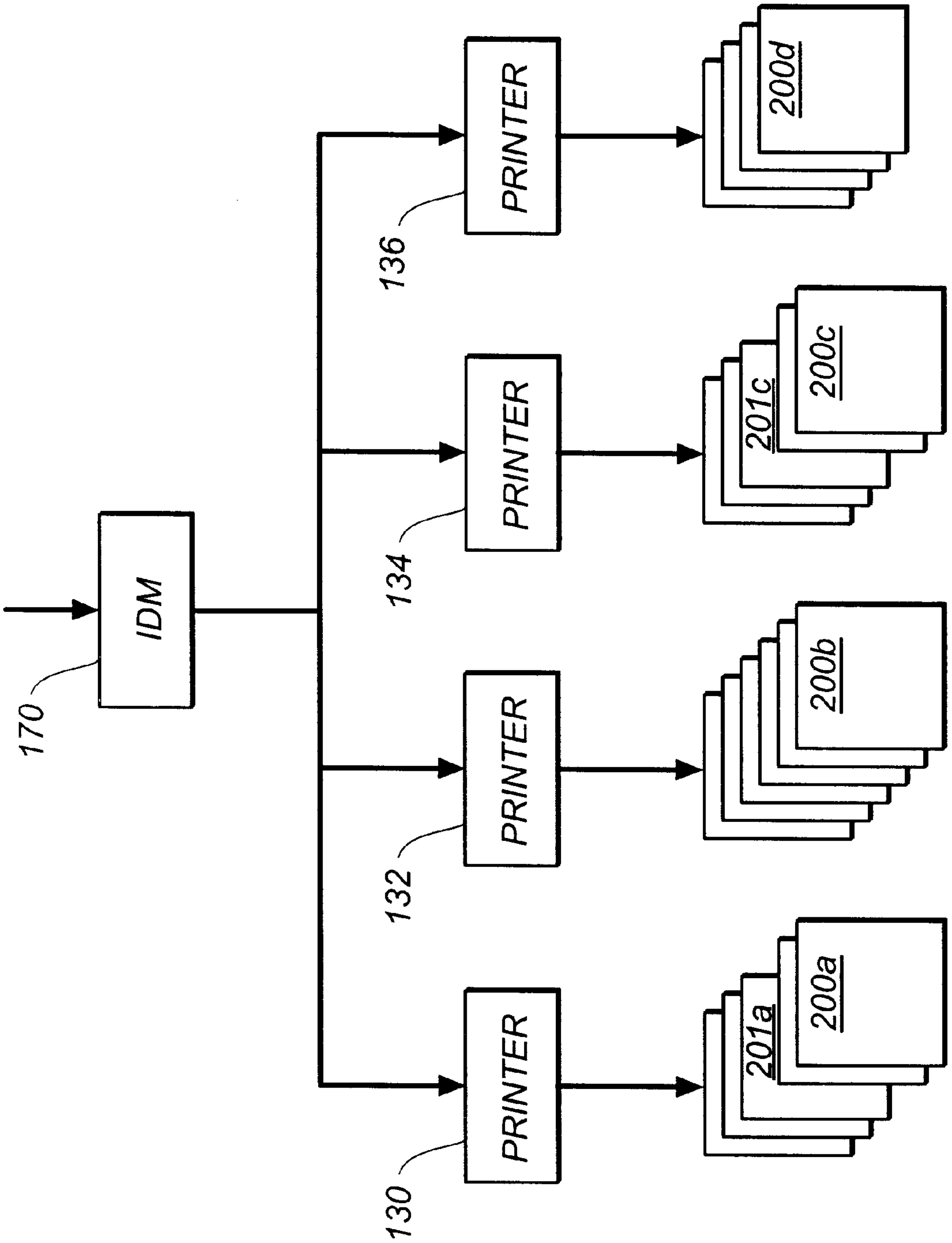
FIG. 3 illustrates a method of the present invention.

A typical sub-order header, following printing by printer 132, is illustrated in FIG. 2 as a printed sub-order header 200*b*. FIG. 3 illustrates other printed sub-order headers 200*a*, 200*c*, 200*d* as produced by printers 130, 134, and an additional printer (not shown in the drawings but which will be referenced as printer 136), respectively. In FIG. 3, the series of unnumbered squares immediately behind each sub-order header 200*a*, 200*b*, 200*c*, 200*d* represent the copies of the same image which are printed in the sub-order containing the corresponding sub-order header. The image data and the sub-order header data together represent a sub-order provided by IDM 170. It will be appreciated though, that while printed sub-orders will typically include printed image copies, the sub-orders themselves (which are provided by IDM 170) need not include any image data. For example, each printer could obtain the image data from another source connected to network 104, such as directly from intermediate storage 105. In such case, IDM 170 would merely provide instructions to each printer as to the number and identity of the image copies for each sub-order (such information could be provided in part or in whole, as part of the sub-order header). Such a configuration eliminates the need for large image data files to pass through IDM 170 before reaching a printer. Each printed sub-order in FIGS. 2 and 3, includes one or more printed copies of an original customer image and the corresponding printed sub-order header. There are four printed sub-orders of a first customer order in the example of FIGS. 2 and 3, namely sub-order headers 200*a*, 200*b*, 200*c*, 200*d* and their associated printed image copies. Note that FIG. 3 also illustrates first and second printed sub-orders of a second customer order. Specifically, the first printed sub-order of the second customer order has printed sub-order header 201*a* and two associated printed image copies. The second printed sub-order of the second customer order has a printed second sub-order 201*c* and two associated printed image copies (which may be the same or different images from those associated with the first sub-order). Again, the sub-orders themselves (that is, the sub-order data) need not necessarily include the image data.

Sub-order headers 200*a*, 200*b*, 200*c*, 200*d* and the images to be printed with each sub-order header, together constitute a first customer order. The similarities between sub-order headers 200*a*, 200*b*, 200*c*, 200*d* will become apparent shortly. Any one of such sub-order headers may be generally referenced as a sub-order header 200. Sub-order header 200*b* includes a unique identification 202 of the customer order from which the sub-order was derived. This unique order identification can be obtained from IDM 170 (which obtains it from code reader 103 or operator station 120, as described above). A time indication 204, supplied by the corresponding printer, indicates when the sub-order header sheet 200*b* was printed. Sub-order header 200*b* further includes a number of copies indication 210 which indicates the number of copies of an image from the customer order, that will be printed (or have been printed) by the printer (printer 132) to which this particular sub-order has been sent by IDM 170 for printing (sometimes referenced as the printer "corresponding" to the particular sub-order). An output device identification 208 is also included in the sub-order header, which identifies the particular printer 132 corresponding to the sub-order header. This latter identification is most conveniently a reference to the type of printer, but alternatively or additionally can include, for example, a symbolic designation (such a character designation, for example, alphanumeric characters) particularly when each printer is labeled with corresponding character designations. An identification of a characteristic of the image prints which will be generated by the corresponding printer for the sub-order (which includes the particular sub-order header 200 of FIG. 2), is provided in the form of a reduced resolution version 212 of such image prints. Output device identification 208, number of copies indication 210, and reduced resolution version 212 are contained within a corresponding printer information region 206, in that they identify characteristics of the sub-order to be printed by the printer 132 which includes sub-order header 200*a*.

Sub-order header 200*b* also includes printer information regions 220*a*, 220*b*, 220*c*, 220*d* relating to all sub-orders of the order. Information regions 220*a*, 220*c*, and 220*d* are other printer information regions which contain information relating to sub-orders of the same order, which are sent to other printers 130, 134, 136. The information of the corresponding printer information region 206 is repeated within region 220*b* so that information on all sub-orders of a given order, can be viewed in a consistent format over one area of sub-order header 200*a*. Each of printer information regions 220 contains an identification region 224 of a corresponding printer (or other output device), a number of copies indication 226 indicating the number of image copies in the sub-order to be printed by that printer, and an estimated time when the sub-order should be finished printing on that printer. Such information is provided in each sub-header by IDM 170. Note that the number of printed image copies in each printed sub-order of the first order, as seen in FIG. 3, is the number indicated in each sub-order header at indications 226*a*, 226*b*, 226*c*, and 226*d* as described below. Specifically, in the example of FIGS. 2 and 3, the first order consists of four sub-orders. The first sub-order ("Product A" in FIG. 2) includes 1 image copy, while the second, third and fourth sub-orders ("Product B", "Product C", "Product D", respectively in FIG. 2) include 5, 1, and 3 image copies, respectively. Each region 220 in FIG. 2 further includes an identification of at least one characteristic of image prints which will be generated by the printer of each sub-order header, in the form of reduced resolution versions 230. In particular, regions 220*a*, 220*c*, 220*d* each provide an identification of image prints which will be printed by all printers (that is, printers 130, 134, 136) other than that which will print the sub-order header 200*b* (that is, printer 132). Note that while reduced resolution versions 212 and 230*b* will typically be the same (since they are referencing the same image prints), any or all of reduced resolution versions 230*a*, 230*b*, 230*c*, 230*d* may be the same or different even for the same customer order. This is so since a customer may have requested printing of the same image or different images from a film roll of a customer order, in the formats provided by printers 130, 132, 134, 136. Sub-order header 200*b* may optionally include a machine readable bar code 240 which may, for example, carry at least the information of order identification 202, and further may carry all other information of sub-order header 200*b* (other than the reduced resolution versions 212 and 230). In an alternative embodiment for a machine implemented system only, sub-order header 200*b* may contain only bar code 240, all human readable information and reduced resolution versions of the images, being dispensed with. It will also be appreciated that bar code 240 could be replaced with any other suitable machine readable code.

It will be appreciated that sub-order headers 200*a*, 200*c*, 200*d* which are printed by other printers 130, 134, 136, respectively, will typically be similar in appearance to sub-order header 200*b* of FIG. 2, and have the same contents. However, region 206 will include information on the corresponding printer, and a low-resolution version of an image to be printed by the corresponding printer. Regions 220*a,* 220*c,* 220*d* would then contain information on all of the other printers (including low resolution versions of images to be printed by those other printers).

In operation of the above apparatus, a customer order in the form of one or more exposed filmstrips (sometimes referenced as "film rolls") is provided to a photofinisher who may operate the apparatus of FIG. 1. The customer order also includes instructions on the number and type of prints desired from the film roll. For example, the instructions may indicate to make one print of every image on the roll, of format which can be printed by printer 130. In the example relating to the first customer order described in connection with FIGS. 2 and 3 above, the instructions would indicate that the customer desires the following: one copy of a first image of a format that can be printed by printer 130 ("Product A" in FIG. 2); five copies of a second different image of a format that can be printed by printer 132 ("Product B" in FIG. 2); one copy of the second image of a format that can be printed by printer 134 ("Product C" in FIG. 2); and three copies of a third image of a format that can be printed by printer 136. ("Product D" in FIG. 2). These instructions can be provided in writing (for example on an envelope accompanying the filmstrip) and/or on a code (such as a magnetic code) on the filmstrip. Multiple filmstrips are spliced at splicer 100 and chemically developed in developer 19 to yield fixed images. The customer's instructions can be input by an operator at operator station 120 or read from the filmstrips by code reader 103. The images on the filmstrips are scanned at scanner 102 to provide corresponding image signals (that is, image data signals) which are stored in storage 105. The customer's instructions for an order, and the identification of stored images in storage 105 (such as image filenames), are forwarded as data to IDM 170 over network 104. IDM 170 uses the received data to create sub-orders for each customer order, each of which includes the respective sub-order headers. The sub-order headers, together with an identification of at least the associated image for each sub-order as stored in storage 105 (again, for example, image filenames) are forwarded to respective printers 130, 132, 134, 136. IDM 170 periodically interrogates each printer as to the status of printing its corresponding sub-order. As this information is obtained, it is forwarded to all printers to be included in their corresponding sub-order header (specifically in regions 228 in FIG. 2) if such sub-order header has not yet been printed. It will be appreciated from this, that not all information for a sub-order header need be forwarded simultaneously to a printer.

Each of the printers 132 through 136 obtains the necessary image data from storage 105 using network 104, and prints the sub-order header and the corresponding number of image copies. In the example of FIGS. 2 and 3, the operator scans the output of printers 130 through 136. When a new order identification 202 is encountered on a printed sub-order header 200, the operator will place the complete sub-order in a predetermined location ("collation site") for assembly of the new order. The operator will also know from region 210 of the first printed sub-order header 200, how many printed copies of the image are to be expected as part of that sub-order. This allows the operator, if desired, to wait for those copies before attempting to transfer the printed sub-order to the predetermined assembly location. If no region 210 was present, the operator would have to wait at the same printer until a sub-order header from another order was printed, or until she was convinced that enough time had elapsed that it could be assumed that the complete sub-order had been printed. However, in the latter situation the operator would essentially be guessing since printing of image copies could simply have stalled or for some reason, slowed. The reduced resolution version 212 provides the operator with characteristics of the printed image copies that are part of the sub-order, by actually showing such image. This also reduces the possibility of an operator, particularly at the assembly location, inadvertently mixing up one printed sub-header with the printed image copies from another printed sub-order (which might lead her to believe that a particular sub-order has been printed, when in fact it has not). Additionally, an indication of which other printers the operator should look to for other printed sub-orders of the same order, the number of image copies to be expected at those other printers, and when he should look to each other printer for the corresponding completed sub-order, is provided by regions 224, 226, and 228 respectively. Reduced resolution versions 230 provide the operator with a clear indication of the characteristics of the other printed images of the order, she should be looking for at those printers. Thus, by inspecting the printed sub-order headers 200, the operator can readily find which other products have been printed up to a given time and on which output devices, thereby assisting the process of order collation and effectively using the operator's time.

If a computer-controlled sub-order collating system is used, the operator may use the machine readable bar code 240, together with a code reader, to determine the collation site and status of each sub-order. Alternatively, a completely automated system may read bar code 240 and automatically route the prints to the collation site. The machine readable printed sub-order headers 200 can accompany the corresponding printed image copies, and can be read by the code reader at the various stages of progress, from printing to shipping, so as to provide a means for checking the integrity of each order at the various stages. It will also be appreciated that the apparatus and method can include the production of any customer orders requesting multiple items unique or personalized to the customer (other than just images), and which will be produced on different output devices other than image printers. In situations where the output devices are not printers, each can be associated with a corresponding printer which prints the sub-order header. "Association" can be accomplished by having each output device physically closer to its corresponding sub-order header printer, than to the sub-order header printers corresponding to other output devices.

Various modifications can be made in the above system and method. For example, IDM 170 could additionally forward a separate index of sub-orders to a printer, which index includes the order identification and an identification of all printers to which sub-orders of the order are forwarded. Other information may include any or all of that as may appear in a sub-order header 200. The printer used could be a separate additional printer (not shown) connected to network 104, or a predetermined one of printers 130 through 136. With this arrangement, an operator would know to look for the separate index at that additional or predetermined printer first, rather than scanning all printers for a printed sub-order header with a new order identification. In addition, while the above described apparatus and method in relation to FIGS. 2 and 3 have assumed that printed image copies of a given sub-order will be printed in a sequence immediately following printing of the corresponding sub-order header, instead one or all of the image printers could print the images of the sub-order allocated to that printer with a common printed identification which could be used to correctly assemble image copies of a sub-order which are not printed in sequence with the remainder of the image copies of a sub-order.

The above described invention thus provides a good mechanism for the production of orders incorporating multiple, personalized items produced on different output devices in a high-volume environment. The invention provides operator support for collating multiple sub-orders of an order, and can assist in tracking order production in progress. The invention further allows for reducing the errors in collating multiple sub-order items produced on different output devices, and enhances operator efficiency. While the present invention includes the possibility of printing each sub-order header on the same sheet or media as one of the printed images of the order, at least in the case of printed images it is preferred to generate a separate printed sub-order header to avoid using space on each printed image sheet. Any mix of output devices of the same or different output speeds can be used, and printed image copies from different orders can be intermingled without affecting the production flow thus optimizing the use of the different output devices and maximizing the system flexibility.

The invention has been described in detail with particular reference to certain preferred embodiments thereof, but it will be understood that variations and modifications can be effected within the spirit and scope of the invention.

What is claimed is:

1. An image printing system for generating multiple printed image copies in response to an order, the image printing system comprising:

(a) a processor which can divide the order into multiple sub-orders for respective image printers, said processor being adapted to provide each sub-order with a sub-order header that includes a unique order identification, an image characteristic identification of at least one characteristic of an image of the sub-order which is to be printed by a corresponding printer, and an indication of the number of copies of the image to be printed by the corresponding printer; and (b) a plurality of image printers connected to the processor, each of which is adapted to receive a corresponding sub-order, print the corresponding sub-order header, and print the numbers of image copies indicated in that header.

2. An image printing system according to claim 1 wherein the processor provides at least one sub-order header with an identification of another printer at which another sub-order is to be printed.

3. An image printing system according to claim 2 wherein the processor also provides that at least one sub-order header with an identification of at least one characteristic of image prints which will be generated by another printer at which another sub-order of the order is printed.

4. An image printing system according to claim 2, additionally comprising:

a print status monitor to determine for an image printer a print status of the corresponding sub-order and to forward print status information to another image printer;

and wherein the other image printer prints the received sub-order status information.

5. An image printing system according to claim 4 wherein the print status monitor determines print status information which includes estimated time for printing the sub-order at the corresponding printer.

6. An image printing system according to claim 2, additionally comprising:

a print status monitor to determine for image printers a print status of the corresponding sub-order and to forward print status information to image printers which have not printed their corresponding sub-order header;

and wherein image printers which have not printed their corresponding sub-order header, print received sub-order status information for other image printers along with their sub-order header.

7. An image printing system according to claim 1 wherein the processor provides a sub-order header for each corresponding image printer which additionally includes an identification of each other image printer to which sub-orders of the order are sent.

8. An image printing system according to claim 1 wherein the processor provides at least one sub-order header which includes an identification of at least one characteristic of image prints which will be generated by the printer to which that sub-order will be sent.

9. An image printing system according to claim 1 wherein the image characteristic identification provided by the processor comprises a reduced resolution version of an image of the corresponding sub-order.

10. An image printing system according to claim 1 wherein each sub-order includes an image signal.

11. An image printing system according to claim 1 wherein the processor also forwards an index of sub-orders to a printer, which index includes an identification of all printers to which sub-orders of the order are forwarded.

12. An image printing system according to claim 11, additionally comprising:

a print status monitor to determine for image printers, a print status of the corresponding sub-order, and forward print status information to image printers which have not printed their corresponding sub-order header; and wherein:

the print status monitor determines print status information which includes estimated time for printing the sub-order at each corresponding printer;

the estimated times for respective printers are printed along with the index; and wherein image printers which have not printed their corresponding sub-order header, print received sub-order status information for other image printers along with their sub-order header.

13. An image printing system according to claim 1 wherein at least one of the image printers prints the images of the sub-order allocated to that printer, sequentially as a series or with a common printed identification.

14. A photofinishing laboratory comprising:

(a) a chemical developer to develop latent images on a film;

(b) a scanner to scan the developed images and generate corresponding image signals;

(c) a memory to store the image signals;

(d) an order receiver to receive an order for generating multiple prints of the images; and (c) an image printing system for generating multiple printed image copies in response to the order, said image printing system having:

(i) a processor which can divide the order into multiple sub-orders for respective image printers, said processor being adapted to provide each sub-order with a sub-order header that includes a unique order identification, an image characteristic identification of at least one characteristic of an image of the sub-order which is to be printed by a corresponding printer, and an indication of the number of copies of the image to be printed by the corresponding printer; and (ii) a plurality of image printers connected to the processor, each of which receives a corresponding sub-order, prints the corresponding sub-order header, and prints the numbers of image copies indicated in that header.

15. A photofinishing laboratory according to claim 14 wherein the order receiver is a code reader which reads the orders in the form of a machine readable code on the films.

16. An image printing method for generating multiple printed image copies in response to an order, the method comprising the steps of:

(a) dividing the order into multiple sub-orders for respective image printers, each sub-order having a sub-order header which includes a unique order identification, an image characteristic identification of at least one characteristic of an image of the sub-order which is to be printed by a corresponding printer, and an indication of the number of copies of the image to be printed by the corresponding printer; and (b) printing at each of a plurality of image printers, a corresponding sub-order header and the number of image copies indicated in that header.

17. A method according to claim 16 wherein at least one sub-order header for a corresponding printer includes an identification of another printer at which another sub-order is to be printed.

18. A method according to claim 17 wherein a sub-order header is provided for each corresponding image printer which additionally includes an identification of each other image printer to which sub-orders of the order are sent.

19. A method according to claim 17 wherein the processor also provides at least one sub-order header with an identification of at least one characteristic of image prints which will be generated by another printer at which the another sub-order of the order is printed.

20. A method according to claim 16 wherein the image characteristic identification provided by the processor comprises a reduced resolution version of an image of the corresponding sub-order.

21. A method according to claim 16 wherein each sub-order includes an image signal.

22. A method according to claim 16 additionally comprising forwarding an index of sub-orders to a printer, which index includes an identification of all printers to which sub-orders of the order are forwarded.

23. A method according to claim 17, additionally comprising:

determining for an image printer, a print status of the corresponding sub-order, and forwarding print status information to another image printer; and printing the received sub-order status information at the other image printer.

24. A method according to claim 16, additionally comprising:

determining for each image printer, a print status of the corresponding sub-order, and forwarding print status information to image printers which have not printed their corresponding sub-order header;

and wherein image printers which have not printed their corresponding sub-order header, print received sub-order status information for other image printers along with their sub-order header.

25. A computer program product for use with a programmable processor communicating with an image order input source and a plurality of image printers, the computer program product comprising: a computer readable storage medium having a computer program stored thereon for performing the steps of:

(a) dividing an order received from the image order input source into multiple sub-orders for respective image printers, including generating a sub-order header having a unique order identification and an indication of the number of copies of the image to be printed by the corresponding printer; and (b) forwarding generated sub-order headers to respective image printers.

26. A computer program product according to claim 25 wherein at least one sub-order header for a corresponding printer includes an identification of another printer at which another sub-order is to be printed.

27. A computer program product according to claim 25 wherein a generated sub-order header is provided for each corresponding image printer which additionally includes an identification of each other image printer to which sub-orders of the order are sent.

28. A computer program product according to claim 25 wherein at least generated one sub-order header includes an identification of at least one characteristic of image prints which will be generated by the printer to which that sub-order is be sent.

29. A computer program product according to claim 25 wherein the computer program additionally performs the step of:

determining for an image printer, a print status of the corresponding sub-order, and forwarding print status information to another image printer.

30. A computer program product according to claim 25 wherein the computer program additionally performs the steps of:

determining for each image printer, a print status of the corresponding sub-order, and forwarding print status information to image printers which have not printed their corresponding sub-order header.

31. An image printing system for generating multiple printed image copies in response to an order, the image printing system comprising:

a processor which can divide the order into multiple sub-orders for respective image printers, each sub-order having a sub-order header which includes a unique order identification and an indication of the number of copies of the image to be printed by the corresponding printer; and a plurality of image printers connected to the processor, each of which is adapted to receive a corresponding sub-order, print the corresponding sub-order header, and print the numbers of image copies indicated in that header;

wherein the processor provides a sub-order header for each corresponding image printer which additionally includes an identification of each other image printer to which sub-orders of the order are sent.

* * * * *